United States Patent Office 3,053,886
Patented Sept. 11, 1962

3,053,886
PROCESS FOR PREPARATION OF CAROTENOIDAL SUBSTANCES
Derek Harold Richard Barton, Northwood, Basil Charles Leicester Weedon, London, and John Bernard Davis, Harpenden, England, assignors to Roche Products Limited, Welwyn Garden City, Herts, England, a corporation of Great Britain
No Drawing. Filed Apr. 10, 1961, Ser. No. 101,658
Claims priority, application Great Britain Apr. 14, 1960
5 Claims. (Cl. 260—488)

The present invention is concerned with a process of manufacturing carotenoidal substances. More particularly it is concerned with a process for the manufacture of carotenoids which contain adjacent keto and enolized keto groups (or the tautomers thereof, having adjacent keto groups) and acyl derivatives thereof. The process is also applicable to the preparation of dehydro-carotenoids which contain adjacent keto and enolized keto groups (or the tautomers thereof, having adjacent keto groups) and acyl derivatives thereof. These dehydro-carotenoids can be partially hydrogenated to the carotenoidal compounds.

More specifically, the products of the process provided by the invention are carotenoidal compounds of the formula

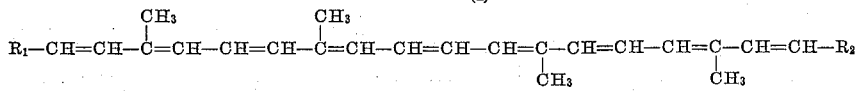

and acyl derivatives thereof; wherein $R_1$ is selected from the group consisting of 4-hydroxy-3-oxo-2,6,6-trimethyl-1,4-cyclohexadienyl and 4-hydroxy-5-oxo-2,6,6-trimethyl-1,3-cyclohexadienyl; and $R_2$ is selected from the group consisting of 4-hydroxy-3-oxo-2,6,6-trimethyl-1,4-cyclohexadienyl and 4-hydroxy-5-oxo-2,6,6-trimethyl-1,3-cyclohexadienyl, and 2,6,6-trimethyl-1-cyclohexenyl.

The dehydro-carotenoid products provided by the process of the invention are compounds of the formula

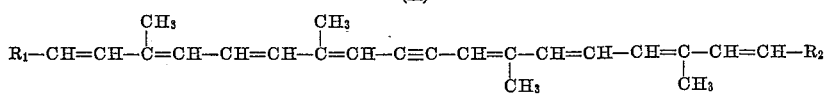

and acyl derivatives thereof; wherein $R_1$ and $R_2$ have the same meaning as given above in Formula I.

Accordingly, compounds exemplary of Formula II, which are manufactured by the process of this invention, are the 1,3,5,7,11,13,15,17-octadecaoctaen-9-ynes corresponding to the 1,3,5,7,9,11,13,15,17-octadecanonaens set forth in Formula I.

The enols of compounds of Formula I and II above form acyl derivatives with aliphatic carboxylic acids, as lower alkanoic acids such as acetic acid, propionic acid, and the like.

The compounds corresponding to Formula I above are highly colored and are useful as coloring materials for foods and cosmetics to produce yellow to red colorations. The compounds corresponding to Formula II above are useful intermediates in the preparation of the compounds corresponding to Formula I. Those substances which contain a central triple bond, i.e. the compounds of Formula II above, can be converted to the compounds of Formula I by partial hydrogenation. One way of converting the dehydro-carotenoidal compounds of Formula II to the carotenoidal compounds of Formula I is to hydrogenate in the presence of a catalyst which selectively catalyzes the reduction of the acetylenic linkage to the olenfiic linkage. One catalyst which can be used is a palladium/lead/calcium carbonate catalyst of the kind described by Lindlar in Helv. Chim. Acta, 1952, 35, 446.

From the foregoing it will be appreciated by those skilled in the art that the unacylated products corresponding to Formulas I and II can exist in either tautomeric form. Thus, when, in this disclosure, the enol form is referred to (i.e. the 4-hydroxy-3-oxo or 4-hydroxy-5-oxo-cyclohexadienyl moiety) it is to be understood that the keto form (i.e the 3,4-dioxo or 4,5-dioxo-cyclohexenyl moiety) is included.

According to the process provided by the invention the compounds corresponding to Formulas I and II above, and the acylation products thereof, are manufactured by oxidizing a member of the group consisting of 1,18-disubstituted - 3,7,12,16 - tetramethyl - 1,3,5,7,9,11,13,15, 17-octadecanonaenes and 1,18-disubstituted-3,7,12,16-tetramethyl - 1,3,5,7,11,13,15,17 - octadecaoctaen - 9 - ynes, wherein one of the substituents is a member of the group consisting of 3-oxo-2,6,6-trimethyl-1-cyclohexenyl; 4-oxo-2,6,6-trimethyl-1-cyclohexenyl, and 5-oxo-2,6,6-trimethyl-1-cyclohexenyl and the other substituent is a member of the group consisting of 3-oxo-2,6,6-trimethyl-1-cyclohexenyl, 4-oxo-2,6,6-trimethyl-1-cyclohexenyl, 5-oxo-2,6,6-trimethyl-1-cyclohexenyl and 2,6,6-trimethyl-1-cyclohexenyl in the presence of an enolizing agent, and, where an acylated compound is required, acylating the oxidation product.

Especially valuable starting materials for the process are cantaxanthin and its 15,15'-dehydro derivatives and echinenone and its 15,15'-dehydro derivative.

The oxidation is advantageously carried out using atmospheric oxygen. It is conveniently carried out by shaking the starting material in an inert solvent or diluent in the presence of air or oxygen until the required amount of oxygen is taken up. Competing reactions are usually involved so that it is normally necessary to allow the absorption of a greater than theoretic quantity of oxygen if high yields are to be obtained.

The enolizing agent can be selected from the group consisting of conventional enolizing agents such as alkali metal alcoholates dissolved in their corresponding alcohol, for example sodium or potassium methoxide in methanol and sodium or potassium ethoxide in ethanol; alkali metal amides in inert solvents, for example sodamide or potassamide in benzene, ether or toluene; alkali metal hydrides in inert solvents, for example sodium hydride in ether, benzene, or toluene; and the like. In a preferred embodiment of the process of the invention an alkali metal alcoholate in solution in its corresponding alcohol is used as the enolizing agent. Especially preferred as the enolizing agent is a solution of potassium tertiary butoxide in tertiary butanol.

Temperature is not a critical factor in the process of the invention. For example, the process can be conducted at room temperature. However, the oxidation can be accelerated by a moderate increase in temperature.

The following examples are given by way of illustrating the process of the invention and are not limitative thereof. All temperatures are stated in degrees centigrade.

*Example 1*

Canthaxanthin (403 mg.) in benzene (5 ml.) was added to potassium tertbutoxide in tertbutanol (1.57 N, 66 ml.) and the mixture was shaken in oxygen at room temperature until 8 moles of oxygen had been absorbed (70 hours). Water (300 ml.) was added, followed by chloroform (150 ml.). The mixture was shaken with 2-N hydrochloric acid (80 ml.), the organic layer was then separated and washed with saturated aqueous sodium hydrogen carbonate followed by water, then diluted with benzene (ca. 50 ml.) and evaporated under reduced pressure giving a deep red residue (324 mg.). Crystallization of a portion (27 mg.) from chloroform/ethanol mixture (1:5) gave 1,18-di-(4-hydroxy-3-oxo-2,6,6-trimethyl-1,4 - cyclohexadienyl) - 3,7,12,16 - tetramethyl - 1,3,5,7,9,11,13,15,17-octadecanonaene as a dark purple microcrystalline powder; M.P. 228°–230° C. (evacuated capillary tube; uncorrected); λ max. (pyridine) 498 mµ ε=100,000; ν max. (chloroform) 3410, 1617, 1555, 1063 and 971 cm.$^{-1}$; τ (deuterochloroform) 8.70, 7.98, and 7.90 p.p.m.

*Example 2*

A portion (68 mg.) of the crude 1,18-di-(4-hydroxy-3-oxo - 2,6,6 - trimethyl - 1,4 - cyclohexadienyl) - 3,7,12,16 - tetramethyl - 1,3,5,7,9,11,13,15,17 - octadecanonaene was acetylated in pyridine with acetic anhydride. Crystallization of the product from chloroform/ethanol mixture (1:6) gave 1,18-di-(4-acetoxy-3-oxo-2,6,6-trimethyl-1,4-cyclohexadienyl) - 3,7,12,16 - tetramethyl - 1,3,5,7,9,11,13,15,17-octadecanonaene; M.P. 232°–233° C. (decomposition); λ max. (pyridine) 497 mµ ε=92,000; ν max. (chloroform) 1756, 1639, 1555, 1055 and 972 cm.$^{-1}$.

We claim:

1. A process of manufacturing a compound selected from the group consisting of compounds of the formula

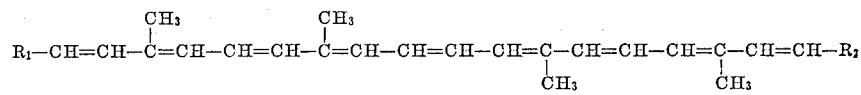

and 15,15′-dehydro derivatives thereof; wherein $R_1$ is selected from the group consisting of 4-hydroxy-3-oxo-2,6,6-trimethyl-1,4-cyclohexadienyl and 4-hydroxy-5-oxo-2,6,6-trimethyl-1,3-cyclohexadienyl, and 2,6,6-trimethyl-1-cyclohexenyl; and $R_2$ is selected from the group consisting of 4-hydroxy-3-oxo-2,6,6-trimethyl-1,4-cyclohexadienyl and 4-hydroxy-5-oxo-2,6,6-trimethyl-1,3-cyclohexadienyl, which comprises oxidizing in the presence of an enolizing agent a compound selected from the group consisting of compounds of the formula

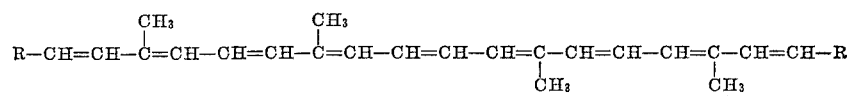

wherein both R's are selected from the group consisting of 3-oxo-2,6,6-trimethyl-1-cyclohexenyl, 4-oxo-2,6,6-trimethyl-1-cyclohexenyl, 5-oxo-2,6,6-trimethyl-1-cyclohexenyl and 2,6,6-trimethyl-1-cyclohexenyl; and at least one R is other than 2,6,6-trimethyl-1-cyclohexenyl; and 15,15′-dehydroderivatives thereof.

2. A process which comprises acylating a product of the process of claim 1.

3. A process as in claim 1 wherein an alkali metal alcoholate is used as the enolizing agent.

4. A process as in claim 1 wherein an alkali metal amide is used as the enolizing agent.

5. A process as in claim 1 wherein an alkali metal hydride is used as the enolozing agent.

No references cited.